United States Patent [19]
Morrison et al.

[11] 3,854,504
[45] Dec. 17, 1974

[54] MULTI-LAYERED PLASTIC PIPE

[75] Inventors: Robert S. Morrison, Piscataway, N.J.; Jack E. Hesse, Englewood, Colo.

[73] Assignee: Johns-Manville Corporation, New York, N.Y.

[22] Filed: June 15, 1972

[21] Appl. No.: 263,323

[52] U.S. Cl. .............................. 138/141, 138/153
[51] Int. Cl. ............................................. F16l 9/12
[58] Field of Search .......... 138/137, 144, 141, 176, 138/172, 153, 140

[56] References Cited
UNITED STATES PATENTS

| | | | |
|---|---|---|---|
| 2,742,931 | 4/1956 | DeGanahl | 138/144 |
| 2,800,145 | 7/1957 | Peierls et al. | 138/137 X |
| 2,850,890 | 9/1958 | Rubenstein | 138/176 UX |
| 3,177,902 | 4/1965 | Rubenstein | 138/176 |
| 3,406,724 | 10/1968 | Carlstrom et al. | 138/141 X |
| 3,483,896 | 12/1969 | Grosh | 138/141 |

*Primary Examiner*—Charles A. Ruehl
*Attorney, Agent, or Firm*—Robert M. Krone; Stephen C. Shear

[57] ABSTRACT

A multi-layered plastic pipe, especially suitable for underground use and for carrying acidic, alkaline or other such corrosive attacking solutions, is disclosed herein and includes an inner circumferential layer comprising organic yarn which adds strength and corrosion resistivity to the pipe and, if desired, particles of sand which add body stiffness thereto, the organic yarn and particles of sand being embedded in a resinous matrix. The pipe also includes an outer circumferential layer comprising glass fibers in the form of circumferential glass roving and, again if desired, particles of sand, both of which are also embedded in a resinous matrix. In order to protect the glass fibers from corrosion attack by the acidic, alkaline or other such solutions, a circumferential protective barrier comprising reinforced organic laminate is positioned between and separately bonded to the inner and outer circumferential layers. This barrier is approximately located at the points of minimum bending strain of the multi-layered pipe, thereby minimizing the possibility of crazing or cracking of the barrier from bending strain in the pipe.

7 Claims, 4 Drawing Figures

PATENTED DEC 17 1974  3,854,504

MULTI-LAYERED PLASTIC PIPE

BACKGROUND OF THE INVENTION

1. Field of the Invention

The present invention is related generally to plastic compositions and more particularly to a multi-layered plastic pipe especially suitable for underground use.

2. Discussion of the Prior Art

Today, flexible, reinforced plastic pipes are being extensively used for a variety of underground services. By appropriate selection of the material comprising the pipes, typically glass filaments in an epoxy or polyester resin, strong structures can be fabricated which are relatively light in weight, compact in design and economical to manufacture. However, glass fiber is extremely susceptible to corrosion upon being exposed to an acid or alkaline solution. These types of solutions are often present in the underground piping. For example, organic sewage material is often carried through the piping. When the sewage material is attacked by bacteria and other micro-organisms, which is often the case, acidic solution is produced thereby. Once the corrosive fluids reach the glass fibers, which provide the overall strength to the pipe, fluid penetration of the entire pipe wall structure can occur very rapidly causing complete mechanical failure.

Heretofore, in order to protect the glass fibers from being exposed to the corrosion causing solutions carried through the pipe, a resin-rich gel coat has been provided at the interior wall surface of the reinforced plastic pipe as a fluid barrier. While this type of typical gel coating has been found to function adequately as a fluid barrier where the reinforced pipe is not subjected to heavy external loading, it has been found, in many cases, not to be completely satisfactory where the pipe is subjected to heavy external loading, which is generally the case when a pipe is located underground. Specifically, in many cases, the internally located fluid barrier has been found to craze or crack when subjected to heavy external loading, thereby exposing the glass fibers to corrosive materials passing through the pipes and thereby causing degeneration of the latter.

Prior to conception of the present invention, various attempts were made to overcome the potential corrosive failure problem of plastic pipes, most of these attempts concentrating on improving the properties of the resin used in the protective barrier. While varying the chemical nature of the resin and the additives used in formulating the overall resin composition have, to some extent, made it possible to improve the susceptibility of the resin to crazing or cracking, this effort has only been partially successful. Even this limited improvement can only be accomplished with a large increase in resin binder and raw material costs, which tends to make such plastic pipes economically uncompetitive with pipes formed of other materials of construction. In addition, it has heretofore been suggested to protect the underground pipes by constructing a protective rib cage therearound. However, this is also economically impractical.

As will be seen hereinafter, in accordance with the present invention, it has been found, in many cases, that cracking or crazing of the aforedescribed fluid barrier has been due to bending strains in the underground pipe caused by the surrounding earth. Specifically, the bending strains in an underground pipe, especially a nonpressure pipe, are generally much larger than the compressive or shear strains. In a typical fiberglass reinforced pipe, these bending strains are at a maximum at the inner layer, that is, where the fluid barrier has been heretofore provided. Hence, the typical fluid barrier generally utilized prior to conception of the present invention, was subjected to maximum bending strain, in many cases causing cracking or crazing thereof. However, as will also be seen hereinafter, in accordance with the present invention, the fluid barrier is located at the point of minimum bending strain along the cross section of the pipe. In this manner, the possibility that the barrier will craze or crack from bending strain and thereby expose the glass fibers comprising part of the pipe construction to corrosive fluids is minimized.

OBJECTS OF THE INVENTION

In accordance with the foregoing, an object of the present invention is to provide a novel combination plastic and glass fiber composition in which there is improved protection of the glass fibers against corrosion attack.

Another object of the present invention is to provide a novel reinforced plastic pipe which includes strength adding glass fibers and which displays improved resistance to corrosion attack of the glass fibers by acidic, alkaline or other such corrosive attacking solutions carried through the pipe.

Still another object of the present invention is to provide a reinforced plastic pipe including a novel locational arrangement of bonded layers including a glass fiber layer, such that protection of the glass fiber layer against corrosion attack by fluids carried through the pipe is substantially improved.

These and other objects and features of the present invention will become apparent from the following descriptions.

DETAILED DESCRIPTION

The present invention is directed to a novel reinforced plastic pipe which is especially suitable for carrying fluids including acidic, alkaline or other such corrosive attacking solutions and which may be readily positioned underground or otherwise subjected to external loading forces causing rather large bending strains therein. As will be seen hereinafter, the reinforced plastic pipe of the present invention is comprised of three circumferentially disposed and bonded together layers. Included in these layers are an outer layer including resin embedded glass fibers, which add strength to the pipe but which are extremely susceptible to corrosive attack by acidic and alkaline solutions, and an inner layer including resin embedded organic yarn which provides both circumferential and longitudinal reinforcement to the pipe and which is much less susceptible to corrosive attack. Positioned between and separately bonded to the inner and outer layers is a fluid barrier for preventing any corrosive attacking fluids carried through the pipe from reaching the glass fibers of the outer layer. As will also be seen hereinafter, this fluid barrier is approximately located at the point of minimum bending strain along the cross-section of the pipe. Hence, the possibility that the barrier will crack or craze due to bending strain in the pipe is minimized which, in turn, minimizes the possibility that the glass fibers will be exposed to corrosive attack.

Figure 1:
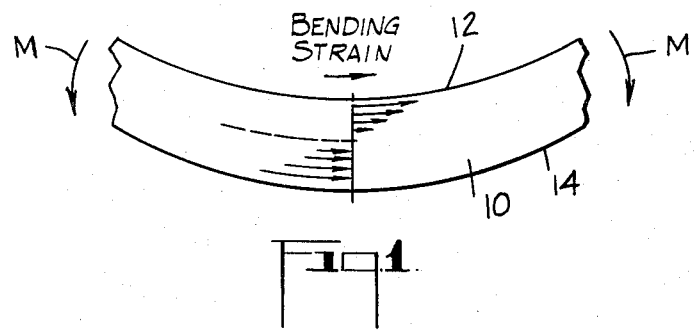
FIG. 1 is a cross-sectional view illustrating an infinitesimal wall section of a flexible pipe or conduit and specifically depicting the distribution of bending strains produced in the conduit or pipe in response to external loading thereof.

Turning now to the drawing, attention is directed to FIG. 1 which illustrates an infinitesimal wall section 10 of a flexible conduit or pipe subjected to external loading forces, generally indicated by arrows M. Typically, where the conduit or pipe is positioned underground, the overlying earth will impart these external loading forces to section 10. The loading forces, in turn, produce rather large bending strains in the pipe section, as compared to compressive or shear strains. The radial distribution of these bending strains is illustrated in FIG. 1.

From FIG. 1, it can be seen that maximum bending strain occurs around the inner surface 12 of the pipe section and maximum bending compression occurs adjacent the outer surface 14 thereof. Between the inner surface 12 and outer surface 14 the bending strain is at a minimum, (actually goes to zero). The exact point of minimum bending strain will depend upon the particular material and amount thereof comprising any given conduit or pipe. For example, if the pipe is constructed of a homogeneous material of uniform density, the point of minimum bending strain will be approximately centrally located between the inner and outer surfaces 12 and 14. In any case, the approximate point of minimum bending strain of a particular pipe of known construction can be easily determined by one with ordinary skill in the art. Hence, for purposes of the present invention, reference to the point of minimum bending strain of a given reinforced plastic pipe shall mean that particular point precalculated by one with ordinary skill in the art in accordance with the particular material or materials comprising the given pipe.

Figure 2:
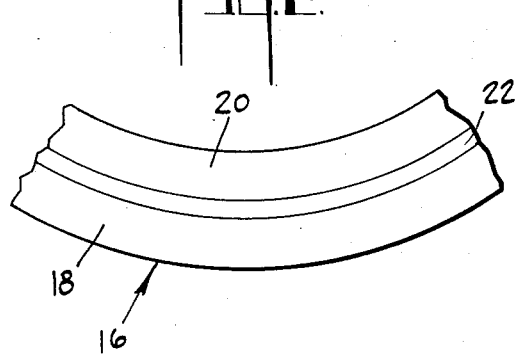
FIG. 2 is a cross-sectional view illustrating a portion of a reinforced plastic pipe constructed in accordance with the present invention.

Turning to FIG. 2, attention is directed to a cross-sectional view of a portion of a reinforced plastic pipe 16, which is constructed in accordance with the present invention. As illustrated, pipe 16 includes an outer circumferential layer 18 of preferably uniform radial thickness, an inner circumferential layer 20 also preferably of uniform radial thickness and a circumferential fluid barrier 22 positioned between and suitably bonded to the inner and outer layers. In accordance with the present invention, the fluid barrier is approximately located along the points of minimum bending strain and separates the outer layer 18 from inner layer 20. Hence, the chances that fluid barrier 22 will crack or craze due to bending strain is minimized, if not completely eliminated. Therefore, glass fibers which, as will be seen hereinafter, are included as part of outer layer 18 are protected from corrosive solutions passing through pipe 16 even though the solution might infiltrate through inner layer 20.

Figure 3:
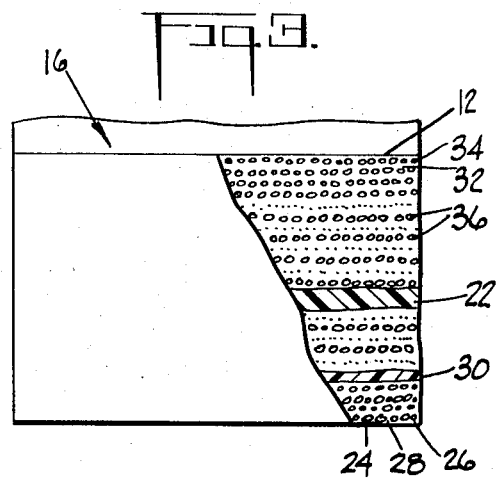
FIG. 3 is an enlarged cross-sectional view of a portion of the pipe of FIG. 2 and specifically illustrating the various sub-layers making up the latter.

As illustrated in FIG. 3, outer layer 18 includes glass fibers 24, preferably circumferential glass roving, which are embedded throughout a conventionally known resinous matrix 26, the glass fibers, of course, being utilized for their strength giving qualities. Sand particles 28 may also be disbursed throughout the resinous matrix, thereby yielding a high degree of stiffness to the pipe in an inexpensive manner. The sand would also aid in building up the wall thickness if desired. Further, in order to reinforce the pipe in the longitudinal direction, one or more circumferential sub-layers 30 of reinforcement glass may be provided in the resinous matrix of outer layer 18.

Inner layer 20 also includes a conventionally known resinous matrix 32 in which organic yarn 34, preferably polyester yarn, is embedded. As shown in FIG. 3, the organic yarn is preferably embedded in resinous matrix 32 so as to form a plurality of circumferential sub-layers, each of which comprises longitudinally spaced sections of the yarn. As stated above, the organic yarn provides both circumferential and longitudinal reinforcement to the pipe and is less susceptible to corrosion than the glass fibers. Like outer layer 18, inner layer 20 may also include particles of sand 36 which are preferably embedded in the resinous matrix 32 so as to form alternate sub-layers positioned between the sub-layers of organic yarn. It is to be understood, however, that the present invention is not limited to this specific sub-layer configuration.

Circumferential fluid barrier 22 comprises reinforced organic laminate, preferably reinforced polyester laminate, which is suitably bonded on its inner surface to inner layer 20 and on its outer surface to outer layer 18. The layer of laminate, as stated above, is located at or approximately at the point of minimum bending strain along the cross-section of pipe 16. Hence, this minimizes the chances that fluid barrier 22 will crack or craze in response to the bending strain in pipe 16. Therefore, in the event that the resinous matrix of inner layer 20 does crack or craze due to the bending strain, the glass fibers comprising part of outer layer 18 will nevertheless be protected from exposure to acidic, alkaline or other corrosive attacking solutions carried through the pipe.

Figure 4:
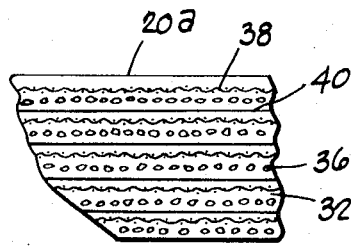
FIG. 4 is a view similar to FIG. 3, however illustrating a portion of a modified plastic reinforced pipe in accordance with the present invention.

Turning to FIG. 4, a modified inner layer 20a is shown and includes the same resinous matrix 32 as layer 20 and may also include the same particles of sand 36. However, a woven polyester yarn 38 is substituted for the nonwoven polyester yarn 34 of inner layer 20. In addition, modified inner layer 20a may include layers of spun bonded polyester mat 40 which serve to provide both longitudinal and circumferential reinforcement to the pipe.

It is to be understood that the specific amount of resin, fiberglass, organic yarn and other aforedescribed materials utilized in pipe 16 will depend upon the desired dimensions, strength and stiffness of the pipe. In any case, once these factors are determined, one with ordinary skill in the art can readily calculate or empirically determine where in the pipe the point of minimum bending strain resides and therefore can appropriately locate fluid barrier 22. In addition, the particular method of bonding together the various layers and sub-layers of pipe 16 is well known and therefore will not be described herein. Further, it is not intended that the present invention be limited to only those materials described above. Other materials may, for example, be added to pipe 10 for thickening, strengthening and/or reinforcement purposes.

What we claim is:

1. A plastic pipe especially suitable for carrying acidic and alkaline solutions underground, said pipe comprising:
   a. an inner circumferential layered section including organic yarn adapted to be exposed to said solutions;
   b. an outer circumferential layered section including glass fibers; and
   c. a circumferential protective barrier including reinforced organic laminate positioned between and separately bonded to said inner and outer circumferential layers, said barrier being approximately located at points of minimum bending strain along the cross-section of the pipe so as to minimize the possibility of crazing to the barrier by said bending strain.

2. A plastic pipe according to claim 1 wherein said inner layered section further includes sand particles and a resinous matrix, said sand particles and organic yarn being embedded in said resinous matrix.

3. A plastic pipe according to claim 2 wherein said organic yarn and sand particles are in the form of layers in said resinous matrix.

4. A plastic pipe according to claim 3 wherein said inner layered section further includes at least one layer of spun bond organic mat.

5. A plastic pipe according to claim 1 wherein said outer layered section further includes sand particles and a resinous matrix, said sand particles and glass fibers being embedded in said resinous matrix.

6. A plastic pipe according to claim 5 wherein said outer layered section further includes at least one layer of reinforced glass.

7. A plastic pipe especially suitable for carrying acidic and alkaline solutions underground, said pipe comprising:
   a. an inner circumferential layered section including a resinous matrix, polyester yarn, sand particles and layers of spunbonded polyester mat, said yarn, sand particles and polyester mat being embedded in said resinous matrix;
   b. an outer circumferential layered section including a resinous matrix, circumferential glass roving, sand particles and at least one layer of reinforced glass, said glass roving, sand particles and reinforced glass being embedded in said resinous matrix; and
   c. a protective barrier including reinforced polyester laminate positioned between and separately bonded to said inner and outer layered sections, said barrier being approximately located at points of minimum bending strain along the cross-section of the pipe so as to minimize the possibility of crazing to the barrier by said bending strain.

* * * * *